United States Patent
Carraro

(10) Patent No.: US 10,734,739 B2
(45) Date of Patent: Aug. 4, 2020

(54) COUPLING DEVICES FOR OPERATIONS ON LIVE ELEMENTS TO ATTAIN EQUIPOTENTIAL CONDITIONS

(71) Applicant: Carraro S.r.l., Paruzzaro (IT)

(72) Inventor: Rinaldo Carraro, Paruzzaro (IT)

(73) Assignee: CARRARO S.R.L., Paruzzaro (NO) (IT)

( * ) Notice: Subject to any disclaimer, the term of this patent is extended or adjusted under 35 U.S.C. 154(b) by 0 days.

(21) Appl. No.: 16/570,159

(22) Filed: Sep. 13, 2019

(65) Prior Publication Data

US 2020/0091632 A1    Mar. 19, 2020

(30) Foreign Application Priority Data

Sep. 19, 2018    (IT) ................. 102018087 11

(51) Int. Cl.
*H01R 13/00* (2006.01)
*H01R 11/14* (2006.01)
*H01R 11/24* (2006.01)

(52) U.S. Cl.
CPC ............. *H01R 11/14* (2013.01); *H01R 11/24* (2013.01)

(58) Field of Classification Search
CPC ...................................................... H01R 11/14
(Continued)

(56) References Cited

U.S. PATENT DOCUMENTS 733,782 A * 7/1903 Werner ................. H01R 11/14

1,484,194 A * 2/1924 Servis .................... C25D 17/10
204/297.09

(Continued)

FOREIGN PATENT DOCUMENTS

CN    102 904 080 A    1/2013
JP    3 318306 B2    8/2002

OTHER PUBLICATIONS

Italian Search Report and Written Opinion dated Jun. 5, 2019, in IT Application No. 102018000008711, 9 pages.

*Primary Examiner* — Neil Abrams
(74) *Attorney, Agent, or Firm* — MH2 Technology Law Group, LLP

(57) ABSTRACT

There is disclosed a coupling device for operations on live elements to attain equipotential conditions. The device comprises two conductive jaws connected to a preferably non-conductive handle. The jaws are adapted to be switched between a closed configuration, in which they are in mutual contact and surround an area adapted to receive a live element, and an open configuration in which the contact portions of the two jaws are spaced apart from each other. The two jaws have respective entry tapering portions adjacent to the contact portions and mutually converging to cause the contact portions to move apart from each other when the live element is pressed against the entry tapering portions, thereby causing the jaws to switch from the closed configuration to the open configuration against the action of an elastic member. The two jaws have respective exit tapering portions adjacent to the contact portions and mutually converging to cause the contact portions to move apart from each other when the live element is pressed against the exit tapering portions, thereby causing the jaws to switch from the closed configuration to the open configuration against the action of an elastic member.

11 Claims, 2 Drawing Sheets

(58) Field of Classification Search
USPC .......................................................... 439/477
See application file for complete search history.

(56) References Cited

U.S. PATENT DOCUMENTS

| | | | | |
|---|---|---|---|---|
| 2,096,790 A | * | 10/1937 | Crump ................... | H01R 11/14 439/477 |
| 2,391,428 A | * | 12/1945 | Link ...................... | H01R 11/14 439/477 |
| 2,419,152 A | * | 4/1947 | Mosebach .............. | H01R 11/14 337/193 |
| 7,156,692 B2 | * | 1/2007 | Jackson, III ........... | H01R 11/15 174/40 R |

* cited by examiner

COUPLING DEVICES FOR OPERATIONS ON LIVE ELEMENTS TO ATTAIN EQUIPOTENTIAL CONDITIONS

CROSS-REFERENCE TO RELATED APPLICATION(S)

This application claims priority under 35 U.S.C. § 119 from Italian Patent Application No. 102018000008711, filed on Sep. 19, 2018, in the Italian Patent and Trademark Office ("IPTO"), the entire contents of which are incorporated herein by reference.

FIELD OF THE INVENTION

The present invention finds application in the field of maintenance on the overhead live lines ("Live-line working" and particularly "Potential working"), for example operating at ultra-high, high or medium voltage. In particular, the invention relates to a device, such as a clamp, to achieve and ensure equipotential conditions when working on these lines.

BACKGROUND ART

When an operator works in contact with a live-line, safety measures must be taken against strokes. As a rule, working should be carried out under equipotential conditions. In other words, the operator and the power line are placed in mutual electric contact to be at the same potential, whereas the operator is adequately insulated from the ground or from other objects at potentials other than that of the line. This will prevent direct passage of current through the operator's body. For example, the operator may work on a live line from an aerial insulating platform or be kept proximate to the live line by a helicopter.

In order to achieve and maintain equipotential conditions, a safety cable must be kept connected at one end to a live-live element as a bare conductive cable, and at the other end to objects in contact with the operator, such as gloves or other conductive garments, as well as with the operator-supporting structure, such as the insulating platform or the helicopter.

In order to ensure connection of the safety cable to the live element of the power line, coupling tools are commonly used, such as clamps or snap hooks, similar to those used on scaffolds for safety against the risk of fall. Such coupling tools have two jaws, which are held together in a closed configuration by a spring. In the closed configuration, the jaws surround the live-line element and hold it in a space therebetween.

In order to insert the live element into the two jaws and remove it therefrom, at least one jaw is pivoted relative to the other, against the action of a spring, to an open configuration in which a passage is created for insertion and/or removal of the live element into/from the space between the jaws.

PROBLEM OF THE PRIOR ART

Prior art coupling devices require a manual action by the operator to pivot the jaws to open the passage for the live element. For example, in clamp-like devices, two handles connected to the jaws must be pressed together, and act as levers like in common pliers or scissors. In snap-hook devices, particularly during removal of the live element, a jaw must be pressed directly toward the area between the jaws.

Similar operations are complicated by the work conditions of operators. Furthermore, operators may be exposed to the risk of contacting the electric potential before equipotential conditions are established.

Another example of known equipotential clamp is described in document CN 102904080. Such clamp is provided with a screwed handle and two jaws hinged to each other. A triangular slider is placed behind the jaws and it can be pushed against them while screwing the handle, thereby forcing the jaws to close and clamp upon a live element without allowing lateral sliding. While unscrewing the handle, a spring moves the jaws back in the open position. It shall be noted that while the device is in use, clamped on a live element, it is impossible to open the jaws for removing the live element without unscrewing the handle or damaging the device. Thus, excessive pull of the device risks to damage the live element.

JP 3318306 describes a peg for retaining and holding in position an insulating sheet upon a bare live element. For insertion and removal of the peg, such a push or pull force will be enough, that conductor and the sheet slide along the inner surfaces of the jaws, thereby opening them against the action of a spring.

Such clamp is suitable only for use up to medium voltage, because insulating sheets are not allowed by regulations in high or ultra-high voltage. Therefore, the measures required for obtaining equipotential and safe conditions for such voltages are not provided, such as an equipotential conductor and no sharp edges. Moreover, the clamp doesn't have a handle adapted to be grabbed, but it is placed in position by a further clamp. Finally, also this peg does not allow for lateral movement of the live elements on which it is clamped, since it is conceived for holding a sheet in a fixed position upon the live element.

SUMMARY OF THE INVENTION

The object of the present invention is to obviate the aforementioned prior art drawbacks, and particularly to ensure simpler and safer opening and closing of the jaws of the coupling device, while always ensuring disconnection in case of emergency, even with no direct action by the operator.

This and other objects are fulfilled by a coupling device for operating on live elements, preferably at high or ultra-high voltage, such as conductive cables or other objects associated with a power line, as defined in any of the accompanying claims. In particular, according to the invention, in the closed configuration the jaws are in mutual contact at respective contact portions to receive a live element, in an inner area between the jaws. The jaws have exit tapering portions which are adjacent to the contact portions and mutually convergent.

The exit tapering portions are shaped to cause the contact portions to move apart from each other, thereby opening the jaws, when a live element in the inner area between the jaws is pulled against the exit tapering portions with a pull-out force that exceeds a first threshold value.

The exit tapering portions may be mutually inclined, for example, with an exit angle of less than 120°, at surfaces tangent to the live element.

Advantageously, once the live element has been clamped, it can be removed from the inner area between the jaws by simply pulling a handle connected to the jaws or, in certain embodiments, directly the safety cable, to thereby overcome the resistance of the elastic member that keeps the jaws closed, without having to press the handles together against the action of the elastic member, or press one of the jaws into the inner area between the jaws. Furthermore, the length of the handle allows the operator to be at an adequate distance from the live parts when he/she moves the clamp toward the live element, or when the coupling device is moved away, during separation from such live parts, while equipotentiality is lost.

Nevertheless, preferably, when the pull-out force is lower than the threshold value, the elastic member keeps the jaws closed in spite of eventual pressures between the live element and the exit tapering portions, caused, for instance, by the weight of the coupling device and the safety cable connected thereto, which are supported by the live line element while the operator is working. For this reason, exit angles of more than 45° are preferred.

In the preferred embodiment the jaws further have entry tapering portions, which lie outside the inner area between the jaws and are formed to cause the contact portions to move apart from each other when a live element is pressed against the entry tapering portions to enter into the inner area between the jaws. Thus, the live element may be advantageously inserted into the inner area between the jaws by simply pressing the jaws against the live element, via the handle, with the live element being arranged between the entry tapering portions. For this reason, entry angles of less than 60° are preferred, which are identified at surfaces tangent to the live element.

BRIEF DESCRIPTION OF THE FIGURES

Further features and advantages of the present invention will result more clearly from the illustrative, non-limiting description of a coupling device for operations on live elements, as shown in the annexed drawings, in which.

DETAILED DESCRIPTION

Figure 1:
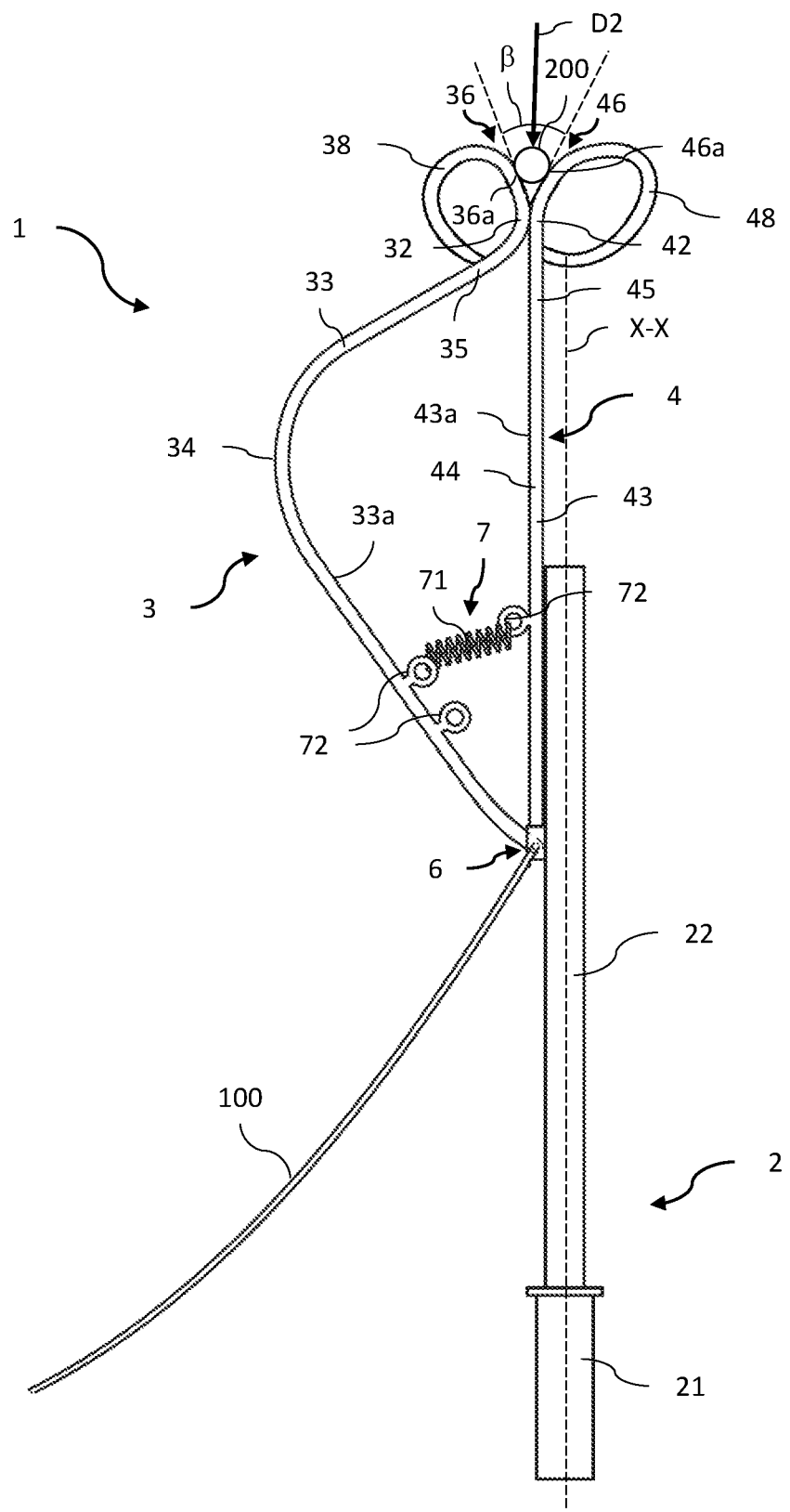
FIG. 1 shows a first embodiment of a coupling device of the invention.

Referring to the accompanying figures, a coupling device for operations on live elements, preferably at high or ultra-high voltage, to attain equipotential conditions is designated by numeral 1. The live elements, which will be recognized by live-line working operators, are exemplified without limitation as conductors, conductive cables and other objects associated with a power line. Nevertheless, reference will be generally made herein to live elements under any voltage with which equipotential conditions are to be attained, which are referenced 200 in the figures and are illustrated as a bare conductive cable in the preferred embodiment.

The coupling device 1 comprises a handle 2, preferably made of an electrically nonconductive material, and two electrically conductive jaws 3, 4, mechanically connected to the handle 2.

An electrically conductive safety cable 100 may be connected to one or both of the jaws 3, 4 in a manner known in the art. The safety cable 100 is adapted to establish an equipotential connection between the jaws 3, 4 and an electrically conductive mass. For this purpose, the coupling device 1 optionally comprises a connector 5 for electrical connection of the safety cable 100 with the jaws 3, 4, as shown for example in FIG. 2. The safety cable 100 can be supplied individually or separately from the coupling device 1.

The handle 2 mainly extends in a longitudinal direction X-X. The handle 2 comprises a handling portion 21 which is designed to be held by an operator's hand, and is preferably longitudinally spaced apart from the jaws 3, 4. In the illustrated embodiments, the handle 2 further comprises a longitudinally extending rod 22 and more in detail the handling portion 21 of the handle 2 is placed at of an end portion of the rod 22 distal from the jaws 3, 4.

It shall be noted that the two jaws 3, 4 are not necessarily directly connected to handle 2 but, for example, in the preferred embodiments a first jaw 3 is indirectly connected to the handle 2 via a second jaw 4, which is in turn directly connected to the handle 2.

Figure 2:
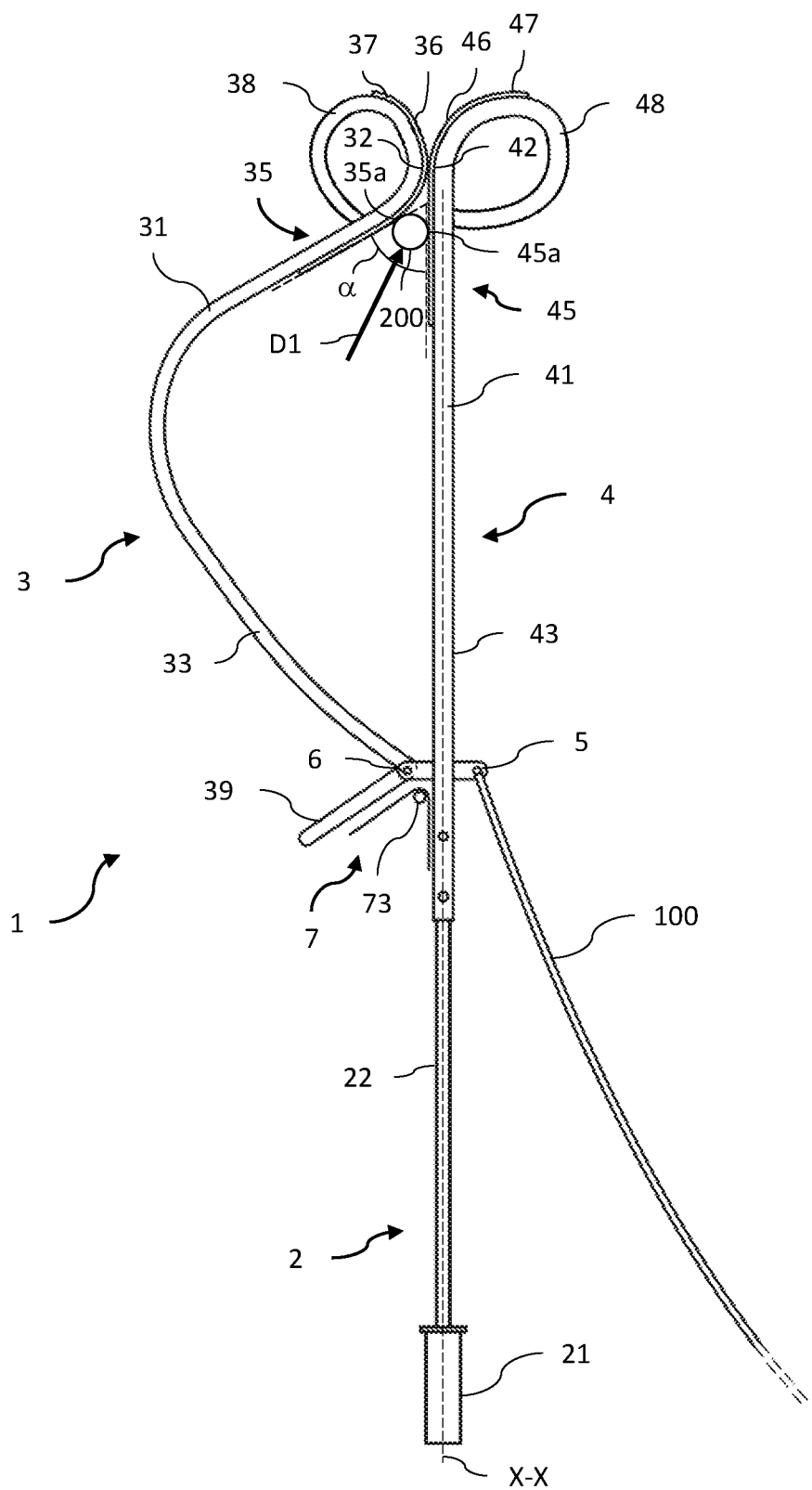
FIG. 2 shows a second embodiment of a coupling device of the invention.

In fact, the coupling device 1 of FIG. 2 comprises a hinge 6 and the jaws 3, 4 are pivotally connected by means of the hinge 6. More in detail, each jaw 3, 4 comprises a respective rigid stem 31, 41 connected to the hinge 6. The stems 31, 41 may have rectilinear portions and/or bent or curved portions, as described in greater detail below. Moreover, the stems 31, 41 have a preferably rounded cross section, for example a circular cross section. The cross section is meant to be transverse to the main development direction of the stem 31, 41 involved.

Preferably, the second jaw 4, and in detail its stem 41, is fixed to the handle 2, e.g. to the rod 22. In detail, the stem 41 of the second jaw 4 has a straight portion 44 which mainly extends in the longitudinal direction X-X. The second jaw 4 is fixed to the handle 2 at the straight portion 44, which may be, for example, longitudinally aligned with the rod 22, as shown in FIG. 2, or offset from the rod 22, as shown in FIG. 1. However, in other embodiments, both jaws 3, 4 may be non-fixedly connected to the handle 2, for example being free to pivot relative to the handle 2.

Both jaws have respective contact portions 32, 42 spaced apart from the hinge 6 and respective main portions 33, 43 which extend between the hinge 6 and the respective contact portions 32, 42. The main portion 43 of the second jaw 4 is substantially defined by the straight portion 44, whereas the main portion 33 of the first jaw 3 is substantially defined by a curved portion between the hinge 6, a maximum distance portion 34 having a maximum distance from the second jaw 4, and the contact portion 32 of the first jaw 3. This curved portion is formed in the stem 31 of the first jaw 3. However, in other embodiments the main portions 33, 43 of both jaws 3, 4 may be curved.

The two jaws 3, 4 are adapted to switch, and particularly to pivot relative to each other, between a closed configuration and an open configuration. In the closed configuration the contact portions 32, 42 of the two jaws 3 and 4 are in mutual contact. Furthermore, the main portions 33, 43 define an internal area therebetween for receiving a live element 200 of a power line. Therefore, in the closed configuration, this area is surrounded by the two jaws 3, 4.

In FIGS. 1 and 2, the jaws 3, 4 are shown in the closed configuration. Furthermore, the live element 200 is shown in FIG. 1 at a time that precedes its entry into the internal area between the jaws 3, 4, and in FIG. 2 at a time that precedes its removal from the internal area.

In the open configuration, the contact portions 32, 42 of the two jaws 3, 4 are spaced apart, whereby the live element 200 may be inserted into and removed from the internal area between the jaws 3, 4 by passing between their respective contact portions 32, 42.

It shall be noted that, unlike the case of snap hooks, the distance between the second jaw 4 and the maximum distance portion 34 of the first jaw 3 is greater in the open configuration than in the closed configuration.

In the embodiment of FIG. 2, the first jaw 3 has a lever portion 39 which is movable toward the handle 2 to pivot the two jaws 3, 4 from the closed configuration to the open configuration. In particular, the hinge 6 is placed between the lever portion 39 and the main portion 33 of the first jaw 3. Nevertheless, the lever portion 39 is totally optional, as the coupling device 1 of the invention may be moved to the open configuration even without using such lever portions 39, as explained hereinbelow.

For example, in the embodiment of FIG. 1, the first jaw 3 is connected to the hinge 6 at one end of the jaw 3 proximal to the handle 2, more in detail an end portion of the stem 31 proximal to the handle 2. Here, the first jaw 3 has no lever portions 39 connected to the main portion 33 which extend beyond the hinge 6.

The coupling device 1 comprises an elastic member 7 configured to counteract the passage of the jaws 3, 4 from the closed configuration to the open configuration. The elastic member 7 may be, for example, a helical spring 71 arranged in the internal area between the two jaws 3, 4, as shown in FIG. 1. In this case, each jaw 3, 4 comprises at least one attachment member 72 for the elastic member 7, located at the respective main portion 33, 43 of the jaw 3, 4. Optionally, at least one jaw 3, 4 comprises a plurality of spaced-apart attachment members 72 for the elastic member 7, such that the elastic member 7 may be selectively connected to different attachment members 72, to thereby adjust the force exerted by the elastic member 7.

Conversely, in the embodiment of FIG. 2, the elastic member 7 is a torsion spring 73, schematically illustrated, located between the lever portion 39 of the first jaw 3 and the handle 2 or the second jaw 4. In this case, the elastic member 7 is configured to counteract the movement of the lever portion 39 toward the handle 2.

In one aspect of the invention, the main portions 33, 43 of the two jaws 3, 4 have respective adjacent exit tapering portions 35, 45, which are connected to the contact portions 32, 42. In particular, the exit tapering portions 35, 45 converge toward the contact portions 32, 42. In more detail, the exit tapering portions 35, 45 and the contact portions 32, 42 of each jaw 3, 4 define together a unique straight or curved profile facing toward the opposite jaw 3, 4.

It shall be noted that, as the exit tapering portions 35, 45 are parts of the main portions 33, 43, they delimit part of the internal area surrounded by the two jaws 3, 4. In other words, the exit tapering portions 35, 45 are arranged between the respective contact portions 32, 42 and the hinge 6.

The exit tapering portions 35, 45 are shaped to cause the contact portions 32, 42 to move apart from each other when, starting from the closed configuration, a live element 200 within the internal area between the jaws 3, 4 is pressed against the exit tapering portions 35, 45 in a pull-out direction D1 toward the contact portions 32, 42 with a pull-out force exceeding a first threshold value. This will cause the jaws 3, 4 to switch from the closed configuration to the open configuration, against the action of the elastic member 7.

In other words, the exit tapering portions 35, 45 define together a funnel-shaped guide that narrows toward the contact portions 32, 42. This guide is closed by the contact portions 32, 42 in the closed configuration and is open between the contact portions 32, 42 in the open configuration.

More in detail, the exit tapering portions 35, 45 of the two jaws 3, 4 have respective tangency surfaces 35a, 45a for the live element 200. These tangency surfaces 35a, 45a are in such arrangement that, in the closed configuration, the live element 200 in the internal area surrounded by the jaws 3, 4 may simultaneously contact both tangency surfaces 35a, 45a, as shown in FIG. 2.

The tangency surfaces 35a, 45a of the exit tapering portions 35, 45 are inclined to each other, in the closed configuration, with an exit angle α. It shall be noted that the vertex of the exit angle α is located substantially at the contact portions 32, 42. The exit angle α is smaller than 120° to allow the contact portions 32, 42 to move apart from each other during removal of the live element 200. As the exit angle α decreases, removal of the live element 200 is facilitated by simply pulling the handle 2 or of the safety cable 100.

In fact, the handle 2 and preferably also the safety cable 100 can be thus pulled to press the live element 200 in the internal area between the jaws 3, 4 against the exit tapering portions 35, 45 in the pull-out direction D1.

In order to further facilitate removal of the live element 200 from the internal area between the jaws 3, 4 by simply pulling the handle 2, the exit tapering portions 35, 45 are in such arrangement that the hinge 6 is located within the exit angle α, at least in its ideal extension along straight lines tangent to the tangency surfaces 35a, 45a. Therefore, the pull-out direction D1 is oriented away from the hinge 6.

In the preferred embodiments, the elastic member 7 is configured to maintain the jaws 3, 4 in the closed configuration when a live element 200 within the internal area surrounded by the jaws 3, 4 is pressed against the exit tapering portions 35a, 45a in the pull-out direction D1 toward the contact portions 32, 42 with a pull-out force that is lower than the first threshold value. This will avoid the risk that the jaws 3, 4 may be inadvertently opened when the operator is not pulling the jaws 3, 4. For this purpose, the exit angle α is preferably greater than 45°. This is because, as the exit angle α increases, the first threshold value also increases, which means that a greater pull-out force is required to bring the jaws 3, 4 to the open configuration.

In order to facilitate the movement of the live element 200 in the internal area between the jaws 3, 4 and its placement between the exit tapering portions 35, 45, the inner edges of the jaws 3, 4 facing the internal area between the jaws 3, 4 preferably have no sharp edges along the extent of the main portion 33, 43 from the hinge 6 to the respective exit tapering portion 35, 45. This also helps to avoid the generation of intense electrical fields caused by the tip discharge effect, as described in greater detail below. Moreover, the lack of sharp edges promotes lateral sliding of the device 1 along the live element 200.

In particular, the main portion 33 of the first jaw 4 has an inner edge 33a that faces the second jaw 4, and this edge has a curved profile between the hinge 6, a maximum distance portion 34 having the maximum distance from the second jaw 4, and the exit tapering portion 35 of the first jaw 3. This inner edge 33a is identified in the curved portion of the stem 31 of the first jaw 3. Depending on the presence or lack of a tapering plate 37, described below, the curved profile of the inner edge 33a of the first jaw 3 may continue without interruptions even further than the exit tapering portion 35, at least up to the contact portion 32, along the stem 31.

Furthermore, the main portion 43 of the second jaw 4 has an inner edge 43*a* that faces the first jaw 3. The inner edge 43*a* of the second jaw 4 extends substantially straight in the longitudinal direction X-X from the hinge 6 to the exit tapering portion 45 of the second jaw 4. This inner edge 43*a* is defined in the straight portion 44 of the stem 41 of the second jaw 4. Also in this case, the straight profile of the inner edge 43*a* of the second jaw 4 may optionally continue without interruptions even further than the exit tapering portion 45, for example up to the contact portion 42, along the stem 41, based also on the presence tapering plates 47.

According to a preferred aspect of the invention, the two jaws 3, 4 further comprise respective entry tapering portions 36, 46. The entry tapering portions 36, 46 are adjacent and connected to contact portions 32, 42, and converge toward the contact portions 32, 42. However, unlike the exit tapering portions 35, 45, the entry tapering portions 36, 46 are connected to the main portions 33, 43 through the contact portions 32, 42. In other words, the entry tapering portions 36, 46 extend from the contact portions 32, 42 away from the main portions 33, 43, as well as from the hinge 6.

However, for each jaw 3, 4, the entry tapering portions 36, 46 continue the straight or curved profile of the exit tapering portions 35, 45 and of the contact portions 32, 42. In other words, the exit tapering portions 35, 45, the contact portions 32, 42 and the entry tapering portions 36, 46 define together the unique profile already described with reference to the exit tapering portions 35, 45 and the contact portions 32, 42 only, which profile in turn optionally continues without interruptions the profile of the inner border 33*a*, 43*a* of the respective jaw 3, 4, based on the presence or lack of tapering plates 37, 47.

The entry tapering portions 36, 46 are shaped to cause the contact portions 32, 42 to move apart from each other from the closed configuration, when a live element 200 is pressed against the entry tapering portions 36, 46 in an insertion direction D2 toward the contact portions 32, 42, upon attainment of an insertion force that is equal to or smaller than a second threshold value. This will cause the jaws 3, 4 to switch from the closed configuration to the open configuration, against the action of the elastic member 7. Clearly the insertion force shall be intended as a non-zero force, which means that there must actually be a positive pressure between the live element 200 and the entry tapering portions 36, 46. It shall be noted that, when insertion begins, the live element 200 is out of the internal area enclosed between the jaws 3, 4.

In other words, the entry tapering portions 36, 46 define together a funnel-shaped guide that narrows toward the contact portions 32, 42 and toward the internal area between the two jaws 3, 4. This guide is closed by the contact portions 32, 42 in the closed configuration and is open between the contact portions 32, 42 in the open configuration.

It shall be noted that, in at least one jaw 3, 4, the entry tapering portion 36, 46 is inclined to the exit tapering portion 35, 45. In particular, the jaws 3, 4 are substantially tangent to each other at the contact portions 32, 42, preferably without crossing.

The insertion direction D2 is substantially opposite to the pull-out direction D1, and particularly is oriented toward the hinge 6.

The exit tapering portions 36, 46 of the two jaws 3, 4 have respective tangency surfaces 36*a*, 46*a* for a live element 200. These tangency surfaces 36*a*, 46*a* are in such arrangement that, in the closed configuration, the live element 200 located out of the internal area surrounded by the jaws 3, 4 may simultaneously contact the tangency surfaces 36*a*, 46*a*, as shown, for example, in FIG. 1. The tangency surfaces 36*a*, 46*a* of the entry tapering portions 36, 46 are inclined to each other, in the closed configuration, with an acute insertion angle β, preferably of less than 45°, e.g. substantially of 30°.

The insertion angle β is preferably selected to be smaller than the exit angle α, such that the second threshold for the insertion force, will be less than the first threshold for the pull-out force. This is useful because, while it is preferable that low extraction forces, such as the weight of the coupling device 1 itself, will not be sufficient to move the jaws 3, 4 to the open configuration, there is no reason to set high thresholds for the insertion force.

It shall be noted that the live element 200 may be inserted into the internal area between the jaws 3, 4 by simply pressing the jaws 3, 4, via the handle 2, against the live element 200, when the latter is placed between the entry tapering portions 36, 46. This operation is further facilitated if at least one of the jaws 3, 4 is fixed to the handle 2, as discussed above with reference to the second jaw 4, to thereby prevent undesired movements of the jaws 3, 4 relative to the live element 200.

In certain embodiments, as shown for example in FIG. 2, at least one jaw 3, 4, preferably both, comprise a tapering plate 37, 47 fixed along the stem 31, 41 of the jaw 3, 4. Each tapering plate 37, 47 has a smooth surface facing the opposite jaw 3, 4, so as to define the unique straight or curved profile described with reference to the contact portions 32, 42, exit tapering portions 35, 45 and entry tapering portions 36, 46. In fact, the contact portion 32, 42, the exit tapering portion 35, 45 and the entry tapering portion 36, 46 (if any) of the jaw 3, 4 are formed in the respective tapering plate 37, 47 at the smooth surface. This will help the live element 200 to slide between the contact portions 32, 42, while preserving the stem 31, 41 of the jaw 3, 4 from abrasion and, at the same time, while avoiding damage to the live element or any other object, 200.

The two jaws 3, 4, namely the stems 31, 41 of the two jaws 3, 4, have respective end portions 38, 48 distal from the handle 2. It shall be noted that the distal end portions 38, 48 are connected to their respective contact portions 32, 42 through the entry tapering portions 36, 46.

Furthermore, at least one jaw 3, 4, preferably both, has a curved profile, for example a spiral, between the respective distal end portion 38, 48 and the respective entry tapering portion 36, 46. In particular, the curved profile has an outer surface facing away from the contact portions 32, 42, which has no tips. More in detail, the end portions 38, 48 will preferably close to contact against the main portions 33 and 43. Advantageously, the absence of tips directed toward or away from the internal area between the jaws 3, 4 prevents the formation of high electric fields caused by corona discharge, as well as the emission of sound waves (noise) and shortwave ultraviolet radiation (UV-C).

A skilled person may obviously envisage a number of changes to the above disclosed variants, without departure from the scope of the appended claims. In particular, various characteristics as shown in the embodiments of FIGS. 1 and 2 can be freely used in the other embodiment, including the longitudinally aligned or offset connection between the handle 2 and the second jaw 4, the provision of the tapering plates 37, 47, the provision of the connector 5 distinct from the hinge 6 for connection of the safety cable 100, the provision of the lever portion 39 and the type of elastic member 7, if any.

The invention claimed is:

1. Coupling device for operations on live elements to attain equipotential conditions, comprising:
   a handle having a handling portion designed to be held by an operator's hand,
   two conductive jaws connected to the handle and pivotally connected to each other via a hinge, the two jaws having respective contact portions spaced apart from the hinge and respective main portions which extend between the hinge and the respective contact portions, wherein the two jaws are adapted to be switched between a closed configuration, in which the contact portions of the two jaws are in mutual contact and the main portions define an internal area therebetween, which is adapted to receive a live element, and an open configuration in which the contact portions of the two jaws are spaced apart from each other, and
   an elastic member, configured to counteract the passage of the jaws from the closed configuration to the open configuration,
   wherein:
   the main portions of the two jaws have respective exit tapering portions adjacent to the contact portions and mutually converging toward the contact portions, the exit tapering portions being shaped to cause the contact portions to move apart from each other when a live element located within the internal area is pressed against the exit tapering portions in a pull-out direction toward the contact portions with a pull-out force that is higher than a first threshold value, thereby causing the jaws to switch from the closed configuration to the open configuration against the action of the elastic member
   the two jaws have respective entry tapering portions adjacent to the contact portions and connected to the main portions via the contact portions, the entry tapering portions mutually converging toward the contact portions, the entry tapering portions being shaped to cause the contact portions to move apart from each other when a live element is pressed against the entry tapering portions of the two jaws in a push-in direction toward the contact portions upon attainment of a push-in force that is equal to or lower than a second threshold value, thereby causing the jaws to switch from the closed configuration to the open configuration against the action of the elastic member,
   in each jaw the exit tapering portions, the contact portions and the entry tapering portions define together a unique straight or curved profile,
   each jaw has a distal end portion which is distal relative to the handle, each jaw having an arched profile between the respective entry tapering portions and the respective distal end portion, such that an outer surface of the arched profile facing away from the contact portions has no tips,
   in each jaw, the end portion closes to contact against the main portion of the respective jaw.

2. A device as claimed in claim 1, wherein the elastic member is configured to maintain the jaws in the closed configuration when a live element disposed within the internal area is pressed against the exit tapering portions in the pull-out direction toward the contact portions with a pull-out force that is lower than the first threshold value.

3. A device as claimed in claim 1, wherein the exit tapering portions of the two jaws have respective tangency surfaces, which are so arranged that, in the closed configuration, a live element in the internal area could simultaneously contact the tangency surfaces of the exit tapering portions of the two jaws, the tangency surfaces of the exit tapering portions being inclined to each other, in the closed configuration, with an exit angle of less than 120°, preferably ranging from 45° to 120°.

4. A device as claimed in claim 1, wherein the entry tapering portions of the two jaws have respective tangency surfaces which are so arranged that, in the closed configuration a live element, located outside the internal area, could simultaneously contact the tangency surfaces of the entry tapering portions of the two jaws, the tangency surfaces of the entry tapering portions being mutually inclined in the closed configuration with an acute entry angle, preferably less than 45°.

5. A device as claimed in claim 1, wherein each jaw comprises a rigid stem connected to the hinge, the stem having a rounded cross section.

6. A device as claimed in claim 5, comprising a guiding plate fixed to the stem and having a smooth surface facing the opposite jaw, wherein the contact portion, the exit tapering portion and the entry tapering portion are formed in the guiding plate at said surface.

7. A device as claimed in claim 1, wherein the main portion of at least one first jaw of the two jaws has an inner edge facing toward a second jaw of the two jaws, the inner edge of the first jaw having a curved profile between the hinge, a maximum distance portion having a maximum distance from the second jaw, and the exit tapering portion of the first jaw.

8. A device as claimed in claim 7, wherein:
   the handle mainly extends in a longitudinal direction, and
   the main portion of the second jaw has an inner edge facing toward the first jaw, the inner edge of the second jaw extending substantially straight in the longitudinal direction from the hinge to the exit tapering portion of the second jaw.

9. A device as claimed in claim 7, wherein each inner edge is free of sharp edges along the extent of the main portion of the respective jaw from the hinge to the respective exit tapering portion.

10. A device as claimed in claim 1, wherein at least one of the two jaws is connected to the hinge at one end of the jaw which is proximal to the handle.

11. A device as claimed in claim 1, comprising an electrically conductive safety cable, connected to at least one of the jaws and adapted to establish an equipotential connection between the jaws and an electrically conductive mass, the safety cable being adapted to be pulled to press a live element within the internal area against the exit tapering portions in the pull-out direction.

* * * * *